UNITED STATES PATENT OFFICE.

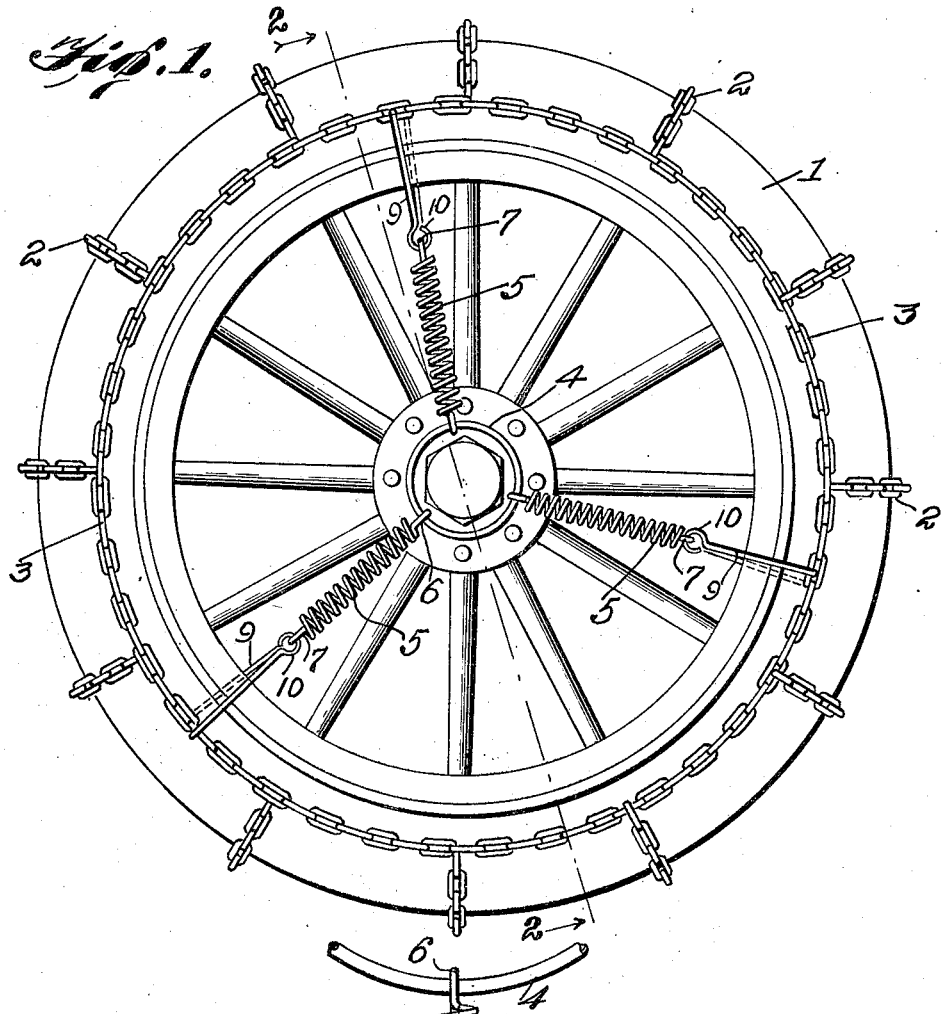
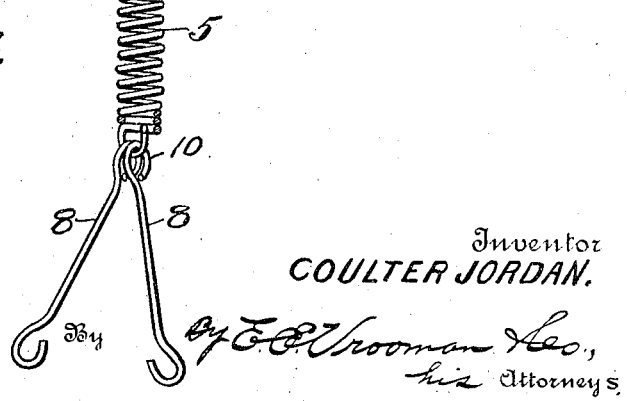

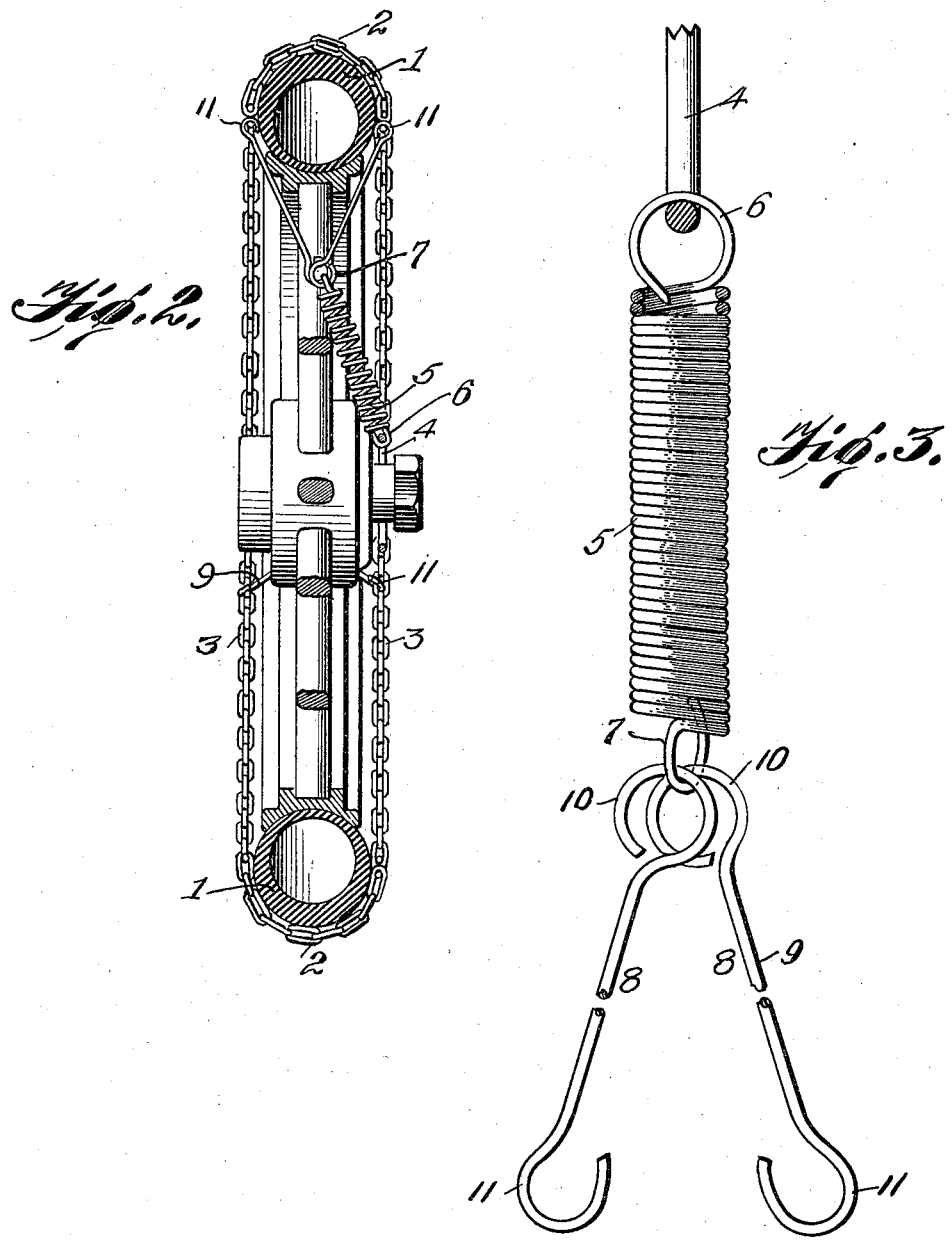

COULTER JORDAN, OF WICHITA, KANSAS.

AUTOMOBILE-CHAIN REGULATOR.

1,299,837. Specification of Letters Patent. Patented Apr. 8, 1919.

Application filed July 13, 1918. Serial No. 244,733.

*To all whom it may concern:*

Be it known that I, COULTER JORDAN, a citizen of the United States, residing at Wichita, in the county of Sedgwick and State of Kansas, have invented certain new and useful Improvements in Automobile-Chain Regulators, of which the following is a specification, reference being had therein to the accompanying drawings.

This invention relates to an automobile chain regulator, and has for its object the provision of simple and efficient means for holding tightly the anti-skid chain upon preferably a pneumatic tire of an automobile wheel.

With this and other objects in view, this invention consists of certain novel constructions, combinations and arrangements of parts as will be hereinafter fully described and claimed.

In the drawings:—

Figure 1 is a view in side elevation of a device constructed in accordance with the present invention.

Fig. 2 is a transverse sectional view taken on line 2—2, Fig. 1, looking in the direction of the arrows.

Fig. 3 is an enlarged fragmentary view of the device, while

Fig. 4 is a view similar to Fig. 3, taken at right angles to the position shown in Fig. 3.

Referring to the drawings by numerals, 1 designates the tire and 2 the anti-skid chain thereon; the chain 2 is provided with the usual body portions 3, to which my improved device is attached.

My device comprises a hub surrounding ring having attached thereto a plurality of springs 5. Each spring 5 comprises a body having a loop 6 formed at its inner end, and a loop 7 formed at its outer end.

Each loop, 6 or 7, has its inner end projecting down into the body of the spring, as shown clearly in Fig. 3. This prevents any foreign object from coming in contact with the inner end of the loop, and as the spring is made of very strong material, it will be hard to bend the loop outwardly so as to displace the inner end thereof within the body of the spring.

To the outer loop 7 of each spring 5, I preferably attach a pair of hooks 8 and each hook comprises a straight body 9, with an inner looped end 10 and an outer hooked end 11. It will be noted that I arrange the hooks 8 so that their outer hooked ends face inwardly, that is, face toward each other, as clearly shown in Fig. 3, whereby the hooks on members 8 can be hooked into the links of the main portions 3 of chain 2, and the inner ends of the hooks will be positioned close to the tire, so that a foreign object, or packing of mud, or snow, against the tire will not cause the hooks to be displaced.

It will be noted that the ring 4, as shown on outside of wheel, is required, and by reason of the positioning it will make it a simple matter to detach the tightening device or regulator, for upon a sufficient amount of strain being placed upon the hooks by the operator, the said hook can be detached from the anti-skid chain and the entire device quickly removed when so desired; the same is equally true when it is found necessary to attach the device to the chain.

What I claim is:—

In a device of the class described, the combination with a surrounding ring, of a plurality of springs attached to said ring, each spring comprises a body having looped portions at its ends, and the inner end of each looped portion projecting down between the inner faces of the body of the spring, a pair of hooked members secured to the outer looped portion of the spring, each hooked member comprising a straight body having a loop at its inner end positioned in the outer looped portion of the spring, and having at its outer end a hook, and the hooks of the pair of hooked members facing inwardly, substantially as shown and described.

In testimony whereof I hereunto affix my signature.

COULTER JORDAN.

Copies of this patent may be obtained for five cents each, by addressing the "Commissioner of Patents, Washington, D. C."